Aug. 30, 1932.                 H. S. JONSSON                 1,874,046
                              ENGRAVING MACHINE
                          Filed July 26, 1929          2 Sheets-Sheet 1

Witness:                                              Inventor:
William P. Kilroy                                     Helge S. Jonsson
                                              By Otto M. Vermich
                                                              Attys Aug. 30, 1932.    H. S. JONSSON    1,874,046
ENGRAVING MACHINE
Filed July 26, 1929    2 Sheets-Sheet 2

Witness:
William P. Kilroy

Inventor,
Helge S. Jonsson
By Otto M. Nernich
Attys

Patented Aug. 30, 1932

1,874,046

UNITED STATES PATENT OFFICE

HELGE S. JONSSON, OF CHICAGO, ILLINOIS

ENGRAVING MACHINE

Application filed July 26, 1929. Serial No. 381,169.

The invention relates to improvements in engraving machines and has as its principal object the production of a machine of this character capable of producing letters, characters or designs upon a cylindrical or curved surface.

A further object of the invention is to provide means whereby the above may be produced from a pattern and a replica, reversal or variations of the design or characters of the pattern as to size and proportions may also be accomplished.

It is another object to provide a work support which is movable in a certain plane horizontally, transversely and through an arc of a circle and to provide a driving connection for an element of the work support whereby said work support is rotated when moved in one direction and is movable parallel to the axis of rotation without producing rotation.

It is a further object of the invention to provide a flexible connection between an element of the work support which flexible connection constantly engages with said element to rotate said element under certain conditions and allows said element and the work to be moved parallel to the axis of rotation without causing rotation of the work and which will cause rotation of the work when the latter is moved out of said axial path, this flexible connection and element with which it cooperates being capable of change and adjustment to thereby provide means for producing a reversed letter, character or design upon said surface and to vary their proportions as to height and width.

The invention has these and other objects, all of which will be more readily understood when read in conjunction with the accompanying drawings which illustrate one embodiment of which the invention is susceptible, it being obvious that changes and modifications may be resorted to without departing from the spirit of the appended claims forming a part hereof.

In the drawings, Fig. 1 is a plan view of an engraving machine having the invention applied thereto;

Figure 1:
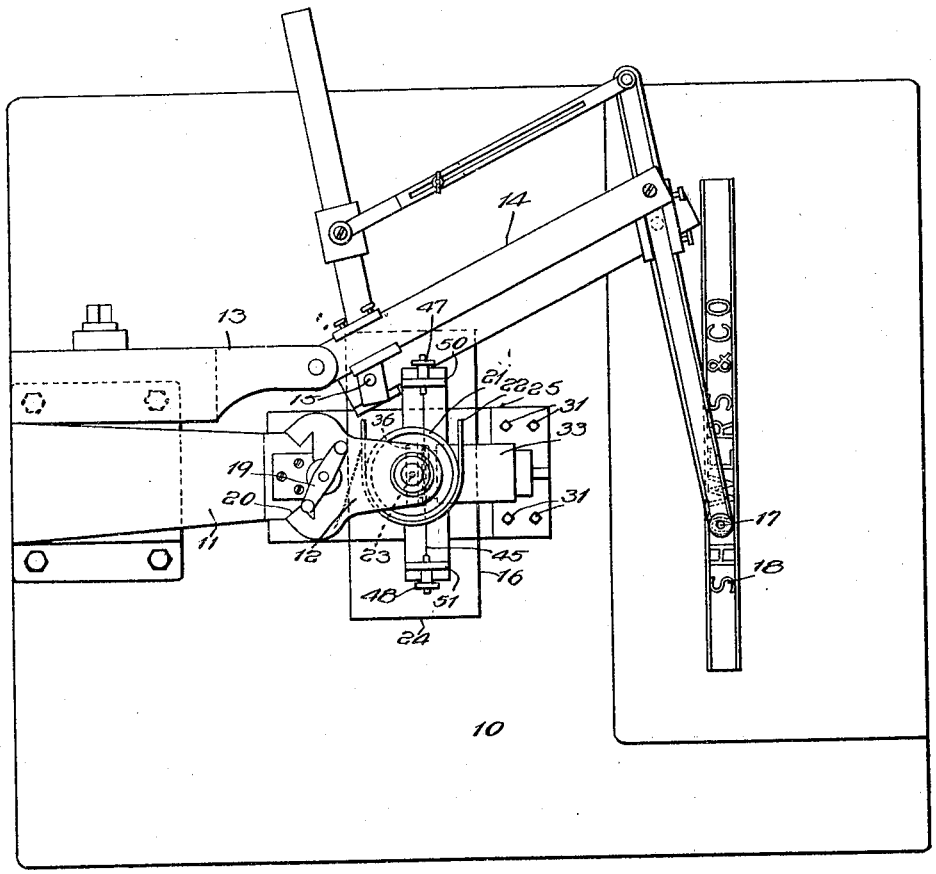
Figure 4:
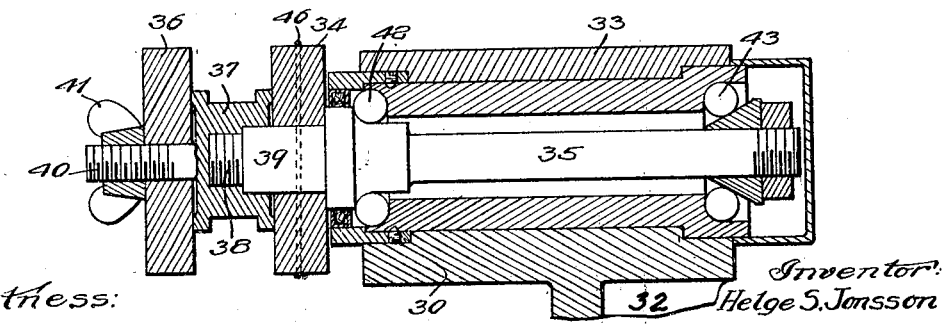
Fig. 4 is an enlarged sectional view taken on the line 4—4 of Fig. 2.

The machine illustrated in Fig. 1 includes a table 10 to which a bracket 11 is secured, the bracket providing means for mounting an adjustable cutter carriage 12 relatively to the table. A bracket 13 having a pantograph mechanism generally designated 14 connected thereto is operatively connected as at 15 for moving a work supporting carriage generally designated 16 according to the movement of the finger 17, the latter of which is part of the pantograph mechanism and is provided to cooperate with a pattern 18 secured to the table 10. It is evident that the pantograph mechanism 14 will transmit motion to the connection 15 and the carriage generally designated 16 corresponding to that of the finger 17 as said finger is moved according to the shape of the letters or design provided in the pattern 18. The cutter carriage 12 is movable for adjustment relatively to the bracket 11 and the work, through the agency of a screw 19, and the grooves 20 provided in the bracket 11 with which the movable head engages. This cutter carriage is further provided with a pulley 21 over which the belt 22 operates to drive the cutter 23. The work supporting carriage generally designated 16 includes a pair of transversely arranged and transversely movable slides 24 and 25 and as before stated, the pantograph mechanism is connected to uppermost of these slides as indicated at 15 in Fig. 1 and therefore, the structure carried by the carriage or slides will be moved in a manner corresponding to that of the finger 17. It may be here stated that the portion 26 of the slide 25 is fast or secured against movement relatively to the table 10, the part 25 being movably held relatively to the part 26 by means of the dovetailed connection shown at 27 in Fig. 2. The slide 24 is formed of two portions arranged transversely to the parts 25 and 26 and includes the part 28 which is permanently fastened to the upper portion of the slide 25, it being understood that the part 29 of the slide 24 is movable upon the part 28 in a direction transverse to that of the upper part of the slide 25. A work support generally designated 30 is secured by means of the bolts 31 to the slide 25. The work support (see Fig. 4) includes an arm 32 and a bearing support 33 which is clearly shown in Fig. 4. This work support also includes a disc 34 which is secured to the shaft 35, the latter of which also provides a support for the work 36. The work or material 36 upon which the work is to be performed is secured to the shaft 35 for rotation with the disc 34 through the medium of a separable connection 37 which is threaded and adapted to be secured to the threaded extension 38 of the shaft 35 which shaft has the portion 39 upon which the disc 34 is removably mounted. The connection 37 has a threaded spindle 40 upon which the work is arranged, the work being clamped to the connection 37 through the agency of a wing nut or other suitable means 41. It will be evident that when the wing nut 41 is removed from the threaded spindle 40 that the work 36 may be arranged upon or removed from the spindle and furthermore that when the connection 37 is disconnected from the threaded extension 38 that the disc 34 may be separated from the portion 39 of the shaft 35, the latter of which is held with relation to the bearing support 33 through the medium of balls and races generally designated 42 and 43 arranged at opposite ends of the shaft.

It is manifest that since this mechanism just described is connected with the slide 25 through the agency of the arm or support 32, that the work support and arm will be moved when the slide 25 is moved relatively to the table 10 by the pantograph mechanism. In other words, the work support and disc are, by virtue of their connection with the slide 25, capable of movement axially of the disc 34 and relatively to the cutter 23 and will thus produce horizontal cuts in work mounted upon the shaft 35 when presented to the cutter. The slide 24 carries a yoke-shaped member 44. This yoke-shaped member 44 is disposed with relation to the disc 34 so that it is in substantial vertical alignment with the disc, the yoke being provided to produce a support for a wire or other flexible element 45 which is wrapped around the disc 34 as indicated at 46 to produce a flexible connection between the disc and yoke. This flexible connection has its opposite ends secured to the tensioning devices generally designated 47 and 48, the latter of which are adjustably mounted in slots 49 provided in each of the arms 50 and 51 of the yoke. From this it can be seen that when the slide 24 is moved through the agency of the pantograph mechanism in directions transverse to the slide 25 that rotative movement is imparted to the disc 34 and the work through the agency of the flexible wire or connection 45. This rotation of the disc and work relatively to the cutter causes the cutter 23 to produce a circumferential cut upon the curved face of the work presented to the cutter.

The foregoing describes the manner in which the work support including the work is moved relatively to the cutter to produce axial and circumferential cuts in the work, it being evident that by means of this structure the work support including the work and the disc 34 may be moved axially of the disc and that the structure is capable of performing this movement without applying any rotative movement to the disc or the work. It is also evident that this structure is also capable of rotating the work without imparting any axial movement thereto. The structure including the transverse slides 24 and 25, the disc 34 and the wire or flexible connection between the disc and the yoke 44, the latter of which is connected to the slide 24 and the pantograph mechanism 14 provides a means whereby irregular or curved letters or characters may be produced upon the peripheral edge of the work by movement of the work relatively to the cutter 23 which, in the structure shown, is held for rotation but stationary with respect to the work. To accomplish this last mentioned feature, the work is simultaneously rotated and moved axially of the disc, and relatively to the cutter, this being permitted, and accomplished through the agency of the flexible connection 45 which will allow the work support to be moved axially of the disc and also move said disc transversely and impart a combined rotative and axial movement to the disc when the wire or flexible connection and the elements to which it is connected such as the slides 24 and 25 are simultaneously moved transversely and axially of the disc. It is manifest that by arranging the slides 24 and 25 so that they may slide or move in transverse directions relatively to each other that the work support and yoke 44 including the flexible connection 45 may be moved to define a regular or irregular curve and that the disc and the work will be simultaneously rotated and moved axially which will present the work to the cutter in a manner to reproduce the particular pattern of the letter or character provided in the pattern 18 should the letter or character include a curve, it being understood that movement of the finger 17 is controlled by the pattern and guided by the operator who moves the finger relatively to the pattern while engagement with the characters or other design provided in the pattern. As an example, should the operator desire to produce the letter O upon the peripheral edge of the disc 36, he will guide the finger 17 relatively to this character provided in the pattern 18. This movement will be transmitted by means of the pantograph mechanism 14 to both of the slides 24 and 25 which will cause simultaneous movement of these slides in transverse directions. This combined transverse movement, causes movement of the slides and elements connected therewith in an arc of a circle. This combined transverse relative movement of the slides 24 and 25 is transmitted to the work and work support which will rotate the disc and simultaneously move the work in a direction axially of the disc and thus present the work to the cutter to produce a regular or irregular curved cut upon the peripheral face of the disc.

The structure including the slides 24 and 25 pantograph mechanism 14, the flexible connection 45 and the disc 34 is such that the rotative and axial movement of the disc bears a certain definite ratio to the movement of the finger 17, which ratio may be changed or varied by setting the pantograph mechanism. In other words, the characters produced on the work may be correspondingly increased or diminished in size and proportion to those of the pattern and may be varied by an adjustment of the pantograph mechanism. The structure is capable of producing letters or characters whose proportions are substantially different in height and width from those of the pattern as will be seen from the following explanation. When it is desired to produce a letter or character corresponding proportionately in height and width with that of the pattern, the pantograph mechanism is set to produce the desired proportion and a disc 34 of the same diameter as that of the work is applied to the shaft 35.

Figure 2:
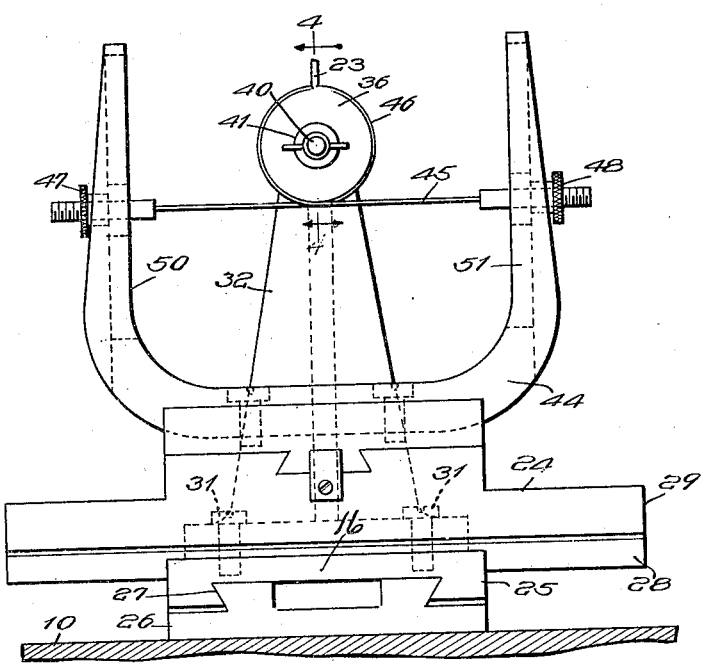
Fig. 2 is an end view of a portion of the structure shown in Fig. 1 showing a work support and means for moving said support in the manner above described.
Figure 3:
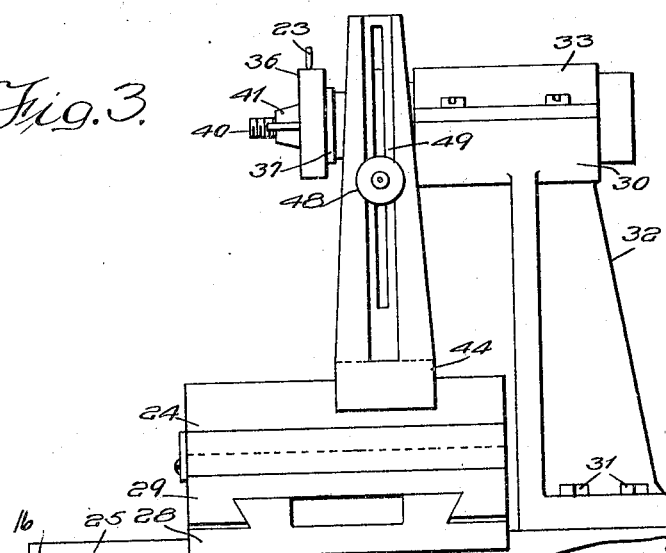
Fig. 3 is a side view of the structure shown in Fig. 2.

The structure is also capable of producing characters or letters which differ from the pattern in either height or width, this being accomplished by varying the diameter of the disc relatively to the diameter of the work. Should it be desired to form the letters in the work which are of a lesser height than width, a disc 34 of a smaller diameter than the work is applied to the shaft 36. This would cause the work to travel a lesser degree of an arc of a circle upon a given movement of the disc which would produce a letter upon the peripheral face of the work the vertical leg of which is of lesser length than the horizontal leg thereof, the latter being unchanged because the distance of axial movement of the work has not been varied. To reverse this mode of operation, that is, to produce a letter which is of a greater height than width, a disc which is larger than the diameter of the work is applied to the shaft 35 from which it can be seen that the disc is rotated through a greater degree of a circle, upon a given movement of the wire transverse to the axis of the disc which results in a character of greater height than width, since the axial movement has not been varied, the width of the character would proportionately correspond to the width of the character of the pattern. The means including the disc 34 and the flexible connection 45 provides a means whereby the letter or character produced upon the face of the work may be reversed to that provided upon the pattern. To accomplish this last mentioned feature, the wire forming the flexible connection is wrapped around the disc so that the ends thereof project from the upper portion of the disc instead of the lower portion thereof as shown in Fig. 2. This causes the rotation of the disc to be reversed and causes the first letter in the pattern to be arranged in the work so that it is the last letter in the name or inscription produced upon the peripheral face of the work.

To compensate for the changes of diameter of the disc 34 and to allow the flexible element 45 to be arranged relatively to the disc in the manner above referred to, the arms 50 and 51 of the yoke 44 are each provided with a slot 49 which allows the flexible element 45 to be arranged in various positions along the length of the slots so that said wire or flexible connection may be arranged on one side or the other of the center of the disc. It is manifest that the tension of the flexible element 45 may be released or applied through the agency of the tension devices 47 and 48 to thereby grip or release the disc 34 to cause its rotation when said yoke 44 is moved transversely to the axis of the disc.

From the foregoing description of the structure, it is manifest that a structure is produced which the peripheral or curved face of a disc or other curved element may be provided with a design or character which corresponds with the proportion of those of a pattern and that the means whereby this may be accomplished may be readily changed so that one part of the letter bears a different proportion to another part thereof and that the design or letter may be formed in said surface so that it is reversed to that of the pattern.

Having thus described my invention, what I claim as new and desire to secure by Letters Patent is:

1. In a machine of the kind described comprising in combination, a cutter rotatable upon a fixed axis, a rotatable and axially movable work support, means for rotating said work support, said means including a rotatable element mounted for rotation upon the axis of rotation of said work support, and means arranged transverse of the axis of said work support cooperating with said rotatable element, a pair of elements connected with each other for movement in transverse directions, a support for said work support connected to one of said elements, and means extending from the other element providing a support for said transverse means which cooperates with said rotatable element of said work support.

2. In a machine of the kind described comprising in combination a cutter rotatable upon a fixed axis, a rotatable and axially movable work support, means for rotating said work support and means for moving said work support axially thereof, elements with which said work support and means for rotating said work support are respectively connected, said last mentioned elements being connected with each other and movable in directions transverse of each other.

3. In a device of the kind described, the combination of a rotatable and axially movable work support, means for rotating said work support, a pair of elements connected with each other for movement in transverse directions, said work support being connected with one of said elements, a member of said means for rotating said work support being connected with the other element, said means for rotating said work support including a rotatable element carried by said work support, and a flexible element which is wrapped around said rotatable element and providing means imparting rotative movement to said rotatable element of said work support upon movement of said flexible element transverse to the axis of said work support.

4. In a machine of the kind described, the combination of a cutting element, a rotatable and axially movable work support and means for rotating and moving said work support axially, a pair of elements connected with each other for movement in transverse directions, said work support being connected with one of said elements, said means for rotating said work support being connected with the other element and including a pair of spaced arms extending from said element, and a member extending between said arms for cooperation with said work support.

5. In a machine of the kind described, the combination of a cutting element, a rotatable and axially movable work support and means for rotating and moving said work support axially, a pair of elements connected with each other for movement in transverse directions, said work support being connected with one of said elements, said means for rotating said work support being connected with the other element and including a pair of spaced arms extending from said element, and a member extending between said arms for cooperation with said work support, said arms and last mentioned member having means whereby said last mentioned member may be movably held in various positions lengthwise of said arms.

In witness whereof, I hereunto subscribe my name this 16th day of July, A. D. 1929.

HELGE S. JONSSON.